Dec. 8, 1925.

W. THORNER 1,564,295

CINEMATOGRAPHIC APPARATUS

Filed Sept. 12, 1922

Inventor:
Walther Thorner
by
Leo J. Matty
atty

Patented Dec. 8, 1925.

1,564,295

UNITED STATES PATENT OFFICE.

WALTHER THORNER, OF BERLIN, GERMANY.

CINEMATOGRAPHIC APPARATUS.

Application filed September 12, 1922. Serial No. 587,668.

*To all whom it may concern:*

Be it known that I, WALTHER THORNER, a citizen of the German Republic, residing at Berlin, Germany, have invented certain new and useful Improvements in Cinematographic Apparatus (for which I have filed application in Germany, September 20th, 1921), of which the following is a specification.

This invention relates to a cinematographic apparatus which is adapted to be used both for reproducing and for photographing cinematographic pictures and which belongs to that class of apparatuses in which the film strip is continually moved, the effect of the continuity of movement being compensated by corresponding movement of a system of reflectors forming a rotating reflector ring having its reflectors so arranged that they are adapted to reflect rays of light impinging thereon towards the inside of the reflector ring.

The invention is an improvement of cinematographic apparatuses of the said kind, the purpose of the improvement consisting therein to avoid disturbances of the normal function of the apparatus by unintentional relative movements of the reflector ring and the transporting means of the film strip, such unintentioned relative movements occurring in known constructions for instance by waste of toothed gearings, etc.

According to the invention any unintentional relative movement between the reflector ring and the transporting means for the film is avoided by firm connection between the reflector ring and the transporting member for the film. Such firm connection between the two members of the apparatus is not in conformity with the requirement that the reflector ring and the film strip must be moved in known construction in opposite directions in order to secure the effect of compensating the continuous movement of the film strip. This difficulty is avoided in the new construction according to the invention thereby that in the path of the light rays between the guide or window for the film strip and the reflector ring an optical system is inserted which comprises besides the objective further optical means including reflectors which are so designed that wandering light rays are moving in the same rotating direction before entering said objective and further optical means and after leaving them. Suitable optical means are the combination of a roof-shaped prism and of a simple rectangular prism arranged at opposite sides of the objective. In such combination the roof-shaped prism counteracts the reversion in the wandering of the light rays produced by the objective in the same way as it was hitherto done by the movement of the film strip and the reflector ring in opposite directions.

Preferably the rotating reflector ring firmly connected with a transporting wheel for the film is arranged in such a way that the axis of rotation is substantially vertically positioned, the bearing for the vertical axis being better adapted to take up the stress of the heavy structure.

An embodiment of the invention is illustrated on the accompanying drawing in a substantially diagrammatic form.

Figure 1:
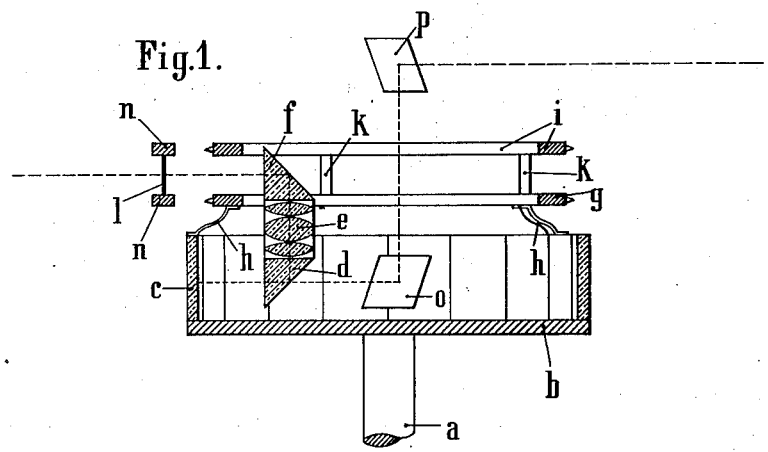
Figure 1 is an axial section through the reflector ring of a cinematographic apparatus and through the film guide connected to said reflector ring, made in accordance with the present invention.
Figure 2:
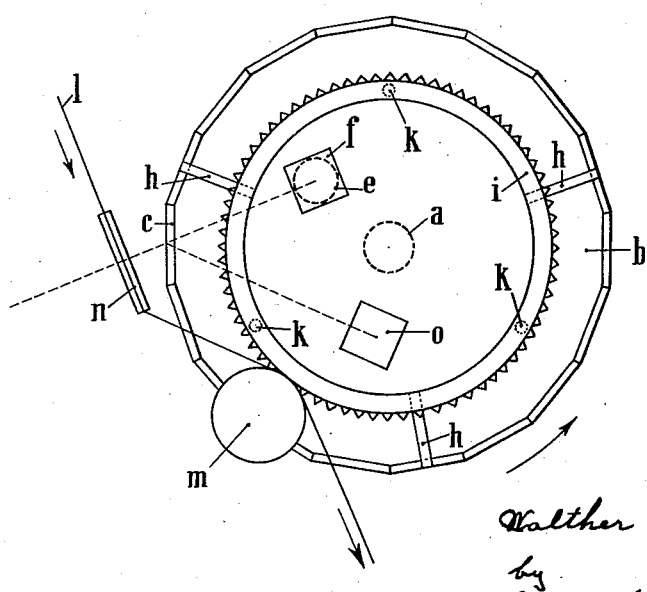
Figure 2 is a plan view of Figure 1.

The axis of rotation of the reflector ring and transporting wheel is designated *a*. *b* is the bottom of the reflector ring whereon the reflectors *c* of the ring are positioned. The reflectors are reflecting towards the inside of the ring. *d* is the roof-shaped prism, *e* the objective and *f* a rectangular prism. These three elements form an optical system inserted in the path of the rays between the reflectors *c* of the ring and the film *l*. The film transporting member comprises two transporting wheels *g* and *i* arranged in some distance from each other and connected with each other by rods *k* and firmly connected with the reflector ring by connecting arms *h*.

The film *l* is shown as running through a fixed guide *n* forming a so-called window suitably dimensioned in dependence from the dimensions of the pictures of the film. The plane of the film guide *n* is inclined to the line of direction from the film guide towards the centre of the reflector ring in such a way that the line of direction from the film guide towards the axis of the objective or the point where it meets the reflecting surface of the prism *f* is rectangular to the plane of said film guide.

*m* is a contact roller pressing the film against the two transporting wheels *g*, *i*. *o* and *p* are two reflectors inserted in the path of the rays between the reflector ring and a screen or the object to be photographed as the case may be. The two reflectors *o* and *p* are arranged one above the other and adapted to effect a displacement of rays so as to bring the rays coming from the object to the inside of the reflector ring or the rays coming from the pictures on the film *l* from the inside of the reflector ring to outside of same and to the screen. The reflectors *o, p* are so inclined with relation to each other that the images which usually are running in lying position through the film guide *n* are projected in upright position through the reflector *p*.

The operation of the device is as follows:

Supposing the pictures of a film *l* are to be projected on a screen not shown on the drawing. The axis *a* of the reflector ring is rotated in any desired speed either by hand or by a motor. Then at the same time the film *l* is drawn through the film guide *n* with a velocity depending from the size of the transporting wheels *g* and *i* which enter with their teeth into holes at the two edges of the film as usually. The light coming from the pictures on the film *l* is reflected by the reflecting surface of the rectangular prism *f*, passes through the objective *e* and impinges on the roof-shaped reflecting surface of the prism *d* and is reflected thereby towards the reflectors *c* of the reflector ring. The reflectors *c* reflect the light rays towards the reflector *o* which on its side reflects the light towards the reflector *p* which finally reflects them towards the screen.

The firm connection between the reflector ring *c* and the transporting wheels *g, i* secures absolute conformity of the movements of the reflector ring and the film.

What I claim is:

1. A cinematographic apparatus comprising in combination a rotatable ring of reflectors having their reflecting surfaces on the inside of the ring, a guide for a film strip, a transporting wheel for the film coaxially with and axially displaced to said reflector ring and in firm connection therewith, an objective and further optical means including reflectors within the path of light rays between said film guide and reflector ring, said further optical means provided between the film guide and the reflector ring in addition to the objective adapted to compensate the image reversion produced by the objective in the direction of the rotation of the reflector ring.

2. A cinematographic apparatus comprising in combination a rotatable ring of reflectors having their reflecting surfaces on the inside of the ring, a guide for a film strip, a transporting ring member for the film in firm connection with said reflector ring and coaxially therewith, an objective and an odd number of reflectors within the path of light rays between said film guide and reflector ring.

3. A cinematographic apparatus comprising in combination a rotatable ring of reflectors having their reflecting surfaces on the inside of the ring, a guide for a film strip, a transporting wheel for the film coaxially with and axially displaced to said reflector ring and in firm connection therewith, the plane of said guide being inclined to the line of direction towards the centre of said reflector ring and transporting wheel, an objective and further optical means including reflectors within the path of light rays between said film guide and reflector ring, said further optical means provided between the film guide and the reflector ring in addition to the objective adapted to compensate the image reversion produced by the objective in the direction of the rotation of the reflector ring.

4. A cinematographic apparatus comprising in combination a rotatable ring of reflectors having their reflecting surfaces on the inside of the ring, a guide for a film strip, a transporting wheel for the film coaxially with and axially displaced to said reflector ring and in firm connection therewith, the plane of said guide being inclined to the line of direction towards the centre of said reflector ring and transporting wheel, an optical system within the path of rays between said reflector ring and said film guide, said optical system positioned inside of the reflector ring and comprising a roof-shaped prism and a rectangular prism and an objective between said two prisms.

5. A cinematographic apparatus comprising a rotatable ring of reflectors having their reflecting surfaces on the inside of the ring, said ring having its axis of rotation positioned substantially in vertical direction, a guide for the film strip, a transporting member for a film strip running through said guide in firm connection with said reflector ring, an objective and further optical means including reflectors within the path of light rays between said film guide and reflector ring, said further optical means provided between the film guide and the reflector ring in addition to the objective adapted to compensate the image reversion produced by the objective in the direction of the rotation of the reflector ring, and two reflecting members positioned one above the other and adapted to effect displacement of rays from outside to inside of the structure, said last named two reflectors being so positioned within the path of the light rays that the reflector ring is positioned between them and the first mentioned optical means with the objective.

6. A cinematographic apparatus comprising in combination a rotatable ring of reflectors having their reflecting surfaces on the inside of the ring, a guide for a film strip, a transporting wheel for the film coaxially with said reflector ring and in firm connection therewith, an objective and further optical means including reflectors within the path of light rays between said film guide and reflector ring, said further optical means provided between the film guide and the reflector ring in addition to the objective adapted to compensate the image reversion produced by the objective in the direction of the rotation of the reflector ring.

In testimony whereof I have signed this specification.

WALTHER THORNER.